United States Patent
Huang et al.

(10) Patent No.: US 10,399,297 B2
(45) Date of Patent: Sep. 3, 2019

(54) METHOD FOR IMPROVING TEAR RESISTANCE OF STRETCHING FILM

(71) Applicant: MOLECON (SUZHOU) NOVEL MATERIALS CO., LTD., Jiangsu (CN)

(72) Inventors: Bin Huang, Fremont, CA (US); Kun Sun, Jiangsu (CN)

(73) Assignee: MOLECON (SUZHOU) NOVEL MATERIALS CO., LTD., Jiangsu (CN)

( * ) Notice: Subject to any disclaimer, the term of this patent is extended or adjusted under 35 U.S.C. 154(b) by 0 days.

(21) Appl. No.: 15/524,285

(22) PCT Filed: Oct. 17, 2015

(86) PCT No.: PCT/CN2015/092142
§ 371 (c)(1),
(2) Date: May 4, 2017

(87) PCT Pub. No.: WO2016/074552
PCT Pub. Date: May 19, 2016

(65) Prior Publication Data
US 2017/0313024 A1    Nov. 2, 2017

(30) Foreign Application Priority Data
Nov. 11, 2014  (CN) .......................... 2014 1 0631681

(51) Int. Cl.
| | |
|---|---|
| B32B 7/00 | (2019.01) |
| B29C 65/18 | (2006.01) |
| B29C 65/48 | (2006.01) |
| B29C 65/00 | (2006.01) |
| B32B 37/16 | (2006.01) |
| B32B 7/12 | (2006.01) |
| B32B 37/14 | (2006.01) |
| B32B 37/12 | (2006.01) |
| B32B 37/10 | (2006.01) |
| B29C 65/14 | (2006.01) |
| B32B 37/06 | (2006.01) |
| B32B 7/03 | (2019.01) |
| B29D 7/01 | (2006.01) |
| B32B 7/10 | (2006.01) |
| B32B 27/32 | (2006.01) |
| B29C 69/02 | (2006.01) |
| B29L 31/00 | (2006.01) |

(52) U.S. Cl.
CPC ............ *B32B 7/03* (2019.01); *B29C 65/1406* (2013.01); *B29C 65/18* (2013.01); *B29C 65/482* (2013.01); *B29C 66/45* (2013.01); *B29C 66/7315* (2013.01); *B29C 69/02* (2013.01); *B29D 7/01* (2013.01); *B32B 7/10* (2013.01); *B32B 7/12* (2013.01); *B32B 27/32* (2013.01); *B32B 37/06* (2013.01); *B32B 37/10* (2013.01); *B32B 37/12* (2013.01); *B32B 37/144* (2013.01); *B32B 37/16* (2013.01); *B29K 2995/0081* (2013.01); *B29L 2031/712* (2013.01); *B32B 2250/02* (2013.01); *B32B 2255/26* (2013.01); *B32B 2307/5825* (2013.01); *B32B 2310/0831* (2013.01); *B32B 2553/00* (2013.01)

(58) Field of Classification Search
CPC ......... B32B 7/005; B32B 37/12; B32B 37/06; B32B 37/10; B32B 37/144; B32B 37/16; B32B 2250/02; B32B 2255/26; B32B 2307/5825; B32B 2310/0831; B32B 2553/00; B29C 65/482; B29C 65/18; B29C 65/1406; B29C 66/45; B29C 66/7315; B29D 7/01; B29K 2995/0081; B29L 2031/712
USPC ...................................... 156/244.17
See application file for complete search history.

(56) References Cited

U.S. PATENT DOCUMENTS

| | | | | |
|---|---|---|---|---|
| 3,342,657 | A * | 9/1967 | Dyer ...................... | B26D 3/162 |
| | | | | 156/163 |
| 4,286,011 | A * | 8/1981 | Wong ...................... | B29C 55/08 |
| | | | | 428/212 |
| 4,475,971 | A | 10/1984 | Canterino | |
| 4,629,525 | A | 12/1986 | Rasmussen | |
| 4,882,230 | A * | 11/1989 | Warner ...................... | B32B 7/02 |
| | | | | 428/516 |

(Continued)

FOREIGN PATENT DOCUMENTS

| | | |
|---|---|---|
| CN | 1559782 | 1/2005 |
| CN | 101117034 | 2/2008 |

(Continued)

OTHER PUBLICATIONS

USPTO Office Action in U.S. Appl. No. 15/524,296 dated May 1, 2019.

*Primary Examiner* — Philip C Tucker
*Assistant Examiner* — Vicki Wu
(74) *Attorney, Agent, or Firm* — Ware, Fressola, Maguire & Barber LLP

(57) ABSTRACT

A method for improving tear resistance of stretch films in which two stretch films are bonded together with an adhesive by hot rolling or UV curing such that their primary stretch directions cross each other. Composite films resulting from the invention possess significantly improved slit tear strength and tear resistance over biaxially stretched films with the same thicknesses. The invention can be widely used to improve tear resistance of stretch films fabricated from various existing materials and processes. In addition, it allows simple operations and is readily applicable to mass production.

9 Claims, No Drawings

(56) References Cited

U.S. PATENT DOCUMENTS

| | | |
|---|---|---|
| 5,350,471 A | 9/1994 | Planeta |
| 5,618,630 A | 4/1997 | Benoit et al. |
| 5,626,944 A | 5/1997 | Rasmussen |
| 5,698,333 A * | 12/1997 | Benoit ................... B32B 7/02 428/516 |
| 2003/0166748 A1 | 9/2003 | Khemani et al. |
| 2003/0166779 A1 | 9/2003 | Khemani et al. |
| 2004/0161599 A1 | 8/2004 | Nishizawa et al. |
| 2004/0225269 A1 | 11/2004 | Zhao et al. |
| 2005/0095411 A1 | 5/2005 | Rasmussen |
| 2006/0182987 A1 * | 8/2006 | Yu ........................ C08F 10/00 428/523 |
| 2009/0317650 A1 * | 12/2009 | Yang ..................... B32B 27/08 428/523 |
| 2010/0159203 A1 | 6/2010 | Shi et al. |
| 2014/0199557 A1 | 7/2014 | Naito et al. |
| 2014/0272356 A1 | 9/2014 | He et al. |
| 2017/0313024 A1 | 11/2017 | Huang et al. |

FOREIGN PATENT DOCUMENTS

| | | | |
|---|---|---|---|
| CN | 101117034 A | * | 2/2008 |
| WO | 2005102669 | | 11/2005 |

* cited by examiner

METHOD FOR IMPROVING TEAR RESISTANCE OF STRETCHING FILM

TECHNICAL FIELD

The present invention relates to a method for improving tear resistance of stretch films and pertains to the field of material processing techniques.

BACKGROUND

Stretch films are thermoplastic plastic films that are stretched and oriented during their fabrication and thermally shrink during the use. Usually, a flat film is first made by extrusion blow molding or extrusion casting and is then either stretched along both its longitudinal and transverse directions or along only one of the direction and not at all in the other directions, at a temperature above its softening point and below its melting point, where the film becomes highly elastic. Stretch films fabricated by the former approach are known as biaxially stretched films, whilst those by the latter approach are called uniaxially stretched films.

Due to their advantages such as being thin, highly transparent, tough, cold-resistant, heat-resistant, pressure-resistant, dust-resistant and waterproof, stretch films have been found wide use in the packaging of food, medicines, electronic devices and other products. However, as macromolecular chains in stretch films are highly oriented along their stretch direction(s), they suffer from low tear resistance along this/these direction(s). In particular, the commonly-used biaxially stretched films are inferior in tear resistance due to orientation of their macromolecular chains along both the stretch directions. This greatly limits the application of stretch films. Therefore, there is an imperative need for improving the tear resistance of stretch films.

Conventional methods for addressing the low tear resistance problem for stretch films can be categorized into chemical methods and physical methods. For example, Chinese Patent Application CN201280003595.5 discloses a tear-resistant film made of a film material including an SEEPS elastomeric block copolymer having a Tm ranging from about 10° C. to 20° C. Chinese Patent Application CN200710050055.3 discloses a multi-directionally tension-resistant, tear-resistant composite film fabricated by flattening a tubular film and stretching it in one direction at a temperature that is higher than its glass transition point and lower than its viscous flow temperature to allow orientation of its macromolecules. It is then inflated to again form a tubular film, and the tubular film is spirally cut along a direction with an angle of 15-75° from the stretch direction and unfolded into a flat film in which the macromolecular orientation is inclined at an angle of 15-75° with respect to the film edges. After that, at least two such unfolded flat films are bonded together in such a manner that their macromolecular orientations cross each other, thereby forming the composite film. These methods are both subject to limitations in use and cannot be universally used for improving the production of stretch films from various existing materials and processes.

SUMMARY OF THE INVENTION

In view of the shortcomings of the prior art discussed above, it is an object of the present invention to provide a method for improving tear resistance of stretch films, which is suitable for extensive use in improving tear resistance of stretch films fabricated from various existing materials and processes.

To achieve the above object, the subject matter of the present invention is as follow: a method for improving tear resistance of stretch films, in which two stretch films are bonded together with an adhesive by hot rolling or UV curing such that their primary stretch directions cross each other.

In a preferred embodiment, the primary stretch directions of the two stretch films form an angle of 30-150°.

In a more preferred embodiment, the primary stretch directions of the two stretch films form an angle of 60-120°.

In an even more preferred embodiment, the primary stretch directions of the two stretch films form an angle of 90°.

In a preferred embodiment, the stretch films are asymmetrically stretched films comprising uniaxially stretched films and asymmetrically biaxially stretched films.

In a more preferred embodiment, ratios of primary stretch ratio to secondary stretch ratio of the asymmetrically stretched films range from (1.2:1) to (4:1).

In a more preferred embodiment, the ratios of primary stretch ratio to secondary stretch ratio of the asymmetrically stretched films range from (1.4:1) to (3.5:1).

In a more preferred embodiment, the asymmetrically stretched films are produced using a flat-film method.

As used herein, the term "asymmetric stretching" refers to a biaxial stretching process performed in such a manner that a stretch ratio in one direction (longitudinal or transverse) is greater than a stretch ratio in the other direction. An extreme scenario of asymmetric stretching is uniaxial stretching, i.e., orientation in only one of the directions and not at all in the other direction. In asymmetric stretching, the direction with the greater stretch ratio is known as a primary stretch direction, while the direction with the lesser stretch ratio is known as a secondary stretch direction. Accordingly, in uniaxial stretching, the direction in which stretching is performed is the primary stretch direction, while that in which stretching is not performed is the secondary stretch direction.

As described herein, the flat film method refers to a process involving: casting a thick sheet using a T-die from pellets produced by an extruder; quickly cooling the sheet and heating it on hot rollers to a temperature for stretching; and performing synchronous or successive stretching as well as a final finish. Here, the synchronous stretching means stretching in both the longitudinal and transverse directions at the same time, while the successive stretching means stretching in one of the directions followed by stretching in the other direction. The present invention is limited neither to stretch films resulting from synchronous stretching or those from successive stretching nor to specific thicknesses of the individual stretch films, and designing according to specific applications is allowed.

According to the present invention, the adhesive used in the bonding by hot rolling or UV curing is an existing adhesive for film bonding that contains a solvent or not, with a two-component polyurethane adhesive not containing a solvent being preferred.

The present invention provides significant advantages over the prior art as follows:

1. Composite films resulting from the invention possess significantly improved slit tear strength and tear resistance over biaxially stretched films with the same thicknesses.

2. It is widely applicable without being limited to specific film materials or stretching processes, and is easily extendible to the existing stretch film production.

3. It allows simple operations and is readily applicable to mass production.

DETAILED DESCRIPTION

The subject matter of the present invention will be described in further detail below with reference to several embodiment examples so that it can be fully understood.

In the examples, each stretch film sample was prepared using a flat-film method including: making a cast sheet with a thickness of about 140-560 mm from a plastic material or a resin (a commercially available PET resin was used in the examples) using a multi-layer extruder (manufactured by Nanjing Chuangbo Machinery Co., Ltd.); placing the cast sheet on a film stretcher (manufactured by Brückner Maschinenbau GmbH and used at Beijing Research Institute of Chemical Industry (BRICI)), clamping it with clips and stretching it according to a preset program (stretch ratios and stretching temperatures); and finishing the resulting film by rapid cooling in the air.

In the examples, tear resistance related tests were carried out using a CH-9002A-20 multi-functional tensile tester (manufactured by Suzhou Baoyuntong Testing Equipment Co., Ltd.). In each test, an approximately 20-mm-long slit was made in the film sample along a tear direction under test, and both ends of the slit were then clamped with clips. Afterward, the test was initiated under the control of an automatic program, followed by data collection.

EXAMPLE 1

An adhesive (e.g., an TS9002A, TS9002B or TS9002C adhesive manufactured by Yantai) was uniformly applied to one side of a stretch film, and another stretch film was then bonded thereto after evaporation of a solvent contained in the adhesive such that a primary stretch direction (with a greater stretch ratio) of the second stretch film crossed that of the first stretch film at angles of 90°. The composite film was then subjected to hot rolling performed on a 60-85° C. roller (the hot rolling temperature might depend on the adhesive used) and then placed at room temperature until it completely cured.

Table 1 shows a tear resistance comparison among composite films formed from respective stretch films with different ratios of primary stretch ratio to secondary stretch ratio using the method according to this Example.

TABLE 1

| Sample | | | | | |
|---|---|---|---|---|---|
| | | Single | | Slit Tear Resistance | |
| Primary Stretch ratio | Secondary Stretch ratio | Layer Thickness (μm) | Sample Thickness (μm) | Tearing Force (kg) | Tear Strength (N/mm) |
| 3.9 | 3.8 | 100 | 100 | 0.07 | 7.18 |
| 3.6 | 3.1 | 150 | 150 | 0.30 | 19.86 |
| 4 | 1 | 75 | 150 | 1.03 | 67.49 |
| 3.5 | 1 | 50 | 100 | 3.00 | 294.00 |
| 2.7 | 1 | 50 | 100 | 3.44 | 337.27 |
| 4 | 2.8 | 70 | 140 | 3.47 | 242.94 |

As can be seen from Table 1, the composite stretch films obtained from the inventive method all had significantly increased tear strength over those of the biaxially stretched single-layer films having the same thicknesses. Although tear strength increased with sample thickness, compared to the 150-μm-thick biaxially stretched single-layer film whose tear strength was only 19.86 N/mm, the tear strength of the inventive 100-μm-thick composite film (with a ratio of primary stretch ratio to secondary stretch ratio of 2.7) was up to 337.27 N/mm. That is, a significant increase in tear resistance was obtained. In addition, the higher the asymmetry, the greater the slit tear strength. Ratios of primary stretch ratio to secondary stretch ratio of (1.4:1)-(3.5:1) corresponded to slit tear strength of 240-340 N/mm. However, at a ratio of primary stretch ratio to secondary stretch ratio of 4, tear strength tended to decrease even when the thickness was increased to 150 μm.

EXAMPLE 2

An adhesive (e.g., an 6062A or 7725B adhesive produced by Henkel) was uniformly applied to one side of a stretch film, and another stretch film was then bonded thereto such that a primary stretch direction (with a greater stretch ratio) of the second stretch film crossed that of the first stretch film at angles of 90°). The composite film was subjected to hot rolling performed on a 60-85° C. roller (the hot rolling temperature might depend on the adhesive used) and then placed at room temperature until it completely cured.

Table 2 shows a tear resistance comparison among composite films formed from respective stretch films with different ratios of primary stretch ratio to secondary stretch ratio using the method according to this Example.

TABLE 2

| Sample | | | | | |
|---|---|---|---|---|---|
| | | Single | | Slit Tear Resistance | |
| Primary Stretch ratio | Secondary Stretch ratio | Layer Thickness (μm) | Sample Thickness (μm) | Tearing Force (kg) | Tear Strength (N/mm) |
| 3.9 | 3.8 | 100 | 100 | 0.07 | 7.18 |
| 3.6 | 3.1 | 150 | 150 | 0.30 | 19.86 |
| 4 | 1 | 75 | 150 | 1.48 | 96.45 |
| 3.5 | 1 | 50 | 100 | 6.22 | 609.79 |
| 4 | 2 | 50 | 140 | 3.57 | 349.86 |

As can be seen from Table 2, the composite stretch films obtained from the inventive method all had significantly increased tear strength over that of the biaxially stretched single-layer films having the same thicknesses. Although tear strength increased with sample thickness, compared to the 150-μm-thick biaxially stretched single-layer film whose tear strength was only 19.86 N/mm, the tear strength of the inventive 100-μm-thick composite stretch film (with a ratio of primary stretch ratio to secondary stretch ratio of 3.5) was up to 609.79 N/mm. That is, a significant increase in tear resistance was obtained. In addition, the higher the asymmetry, the greater the slit tear strength. Ratios of primary stretch ratio to secondary stretch ratio of (2:1)-(3.5:1) corresponded to slit tear strength of 340-610 N/mm. However, at a ratio of primary stretch ratio to secondary stretch ratio of 4, tear strength tended to decrease even when the thickness was increased to 150 μm.

It is revealed from a comparison between Tables 1 and 2 that when an adhesive containing a solvent is used in the bonding by hot rolling, the solvent may cause loose molecular orientation in the stretch films and hence lower tear strength.

EXAMPLE 3

With reference to Example 2, a tear resistance comparison was made between a composite film resulting from asymmetrically biaxially stretched films obtained by simultaneous stretching and a composite film resulting from asymmetrically biaxially stretched films obtained by successive stretching.

The test results are presented in Table 3.

TABLE 3

| Sample | | | | | Slit Tear Resistance | |
| --- | --- | --- | --- | --- | --- | --- |
| Primary Stretch ratio | Secondary Stretch ratio | Single Layer Thickness (μm) | Sample Thickness (μm) | Tearing Force (kg) | Tear Strength (N/mm) | |
| 4 | 2.8 | 70 (simultaneous stretching) | 140 | 0.78 | 54.81 | |
| 4 | 2.8 | 70 (successive stretching) | 140 | 0.61 | 42.95 | |

As can be seen from the results in Table 3, the slit tear strength of the composite film made from the simultaneously biaxially stretched films was slightly higher than that of the composite film made from the successively biaxially stretched films, although the difference was significant.

It is noted here that, the above embodiments are presented merely to describe the subject matter of the present invention in further detail and are not to be construed as limiting the scope of the invention. Non-substantive improvements and modifications made by those skilled in the art in accordance with the above disclosure all fall within the scope of the present invention.

What is claimed is:

1. A method for improving tear resistance of a composite film, the composite film comprising two stretched films bonded together with an adhesive by hot rolling or UV curing, each of the stretched films comprising a primary stretch ratio in a primary stretch direction and a secondary stretch ratio in a secondary stretch direction substantially perpendicular to the primary stretch direction, wherein a ratio of the primary stretch ratio to the secondary stretch ratio in each of the stretched films is in the range between 1.4:1 and 3.5:1, wherein at least one of the two stretched films is an asymmetrically biaxially stretched film, said method comprising arranging the two stretched films such that their primary stretch directions cross each other.

2. The method of claim 1, wherein the primary stretch directions of the two stretched films form an angle of 30-150°.

3. The method of claim 1, wherein the primary stretch directions of the two stretched films form an angle of 60-120°.

4. The method of claim 1, wherein the primary stretch directions of the two stretched films form an angle of 90°.

5. The method of claim 1, wherein the two stretched films comprise one uniaxially stretched film and one asymmetrically biaxially stretched film.

6. The method of claim 5, wherein each of the stretched films is formed using a flat-film method.

7. The method of claim 1, wherein both of the two stretched films are asymmetrically biaxially stretched films.

8. The method of claim 1, wherein the asymmetrically biaxially stretched film is simultaneously stretched in the primary stretch direction and in the secondary stretch direction.

9. The method of claim 1, wherein the asymmetrically biaxially stretched film is successively stretched in the primary stretch direction and in the secondary stretch direction.

* * * * *